United States Patent Office 3,439,972
Patented Apr. 22, 1969

3,439,972
WIDE-ANGLE STEREOSCOPIC PICTURE ELEMENT AND VIEWER
Harvey L. Ratliff, Jr., Oxon Hill, Md., assignor to Jetru Inc., Amarillo, Tex.
Original application Apr. 1, 1965, Ser. No. 447,600, now Patent No. 3,272,069, dated Sept. 13, 1966. Divided and this application Apr. 22, 1966, Ser. No. 544,462
Int. Cl. G02b 27/22
U.S. Cl. 350—131                                    9 Claims

ABSTRACT OF THE DISCLOSURE

A picture element is employed which permits a wide-angle stereoscopic view to be formed by overlapping a left and a right eye image in a central area.

In one embodiment a grating screen is employed which coacts with adjacent right and left eye view strips in an overlapped central area to separate a right and left eye image; a second embodiment employs a lenticular screen coacting with adjacent right and left eye view strips in an overlapped central area to separate a right and left eye image; a third embodiment employs polarized images in conjunction with analyzers to separate a left and right eye image in an overlapped central area; and a fourth embodiment employs a mirror arrangement to separate a left and a right eye view in an overlapped central area.

---

This application is a divisional application of my co-pending U.S. Patent 3,272,069, issued Sept. 13, 1966, the original being filed Nov. 15, 1962.

The present invention relates generally to wide angle stereoscopic picture elements.

It is the primary object of the present invention to teach a picture element which may be viewed without the viewing of a dividing strip between the left and right eye views and without the viewing of both eye views with each eye to ruin the stereo effect and to severely limit the angle of view unless very short focal length oculars are used in the viewing of the picture.

It is a further object of the present invention to teach a picture element which may be viewed without very short focal oculars to re-create extremely wide angle stereoscopic scenes.

Other objects and advantages of my invention will become apparent from a study of the following description taken with the accompanying drawings wherein.

Figures 1, 2:
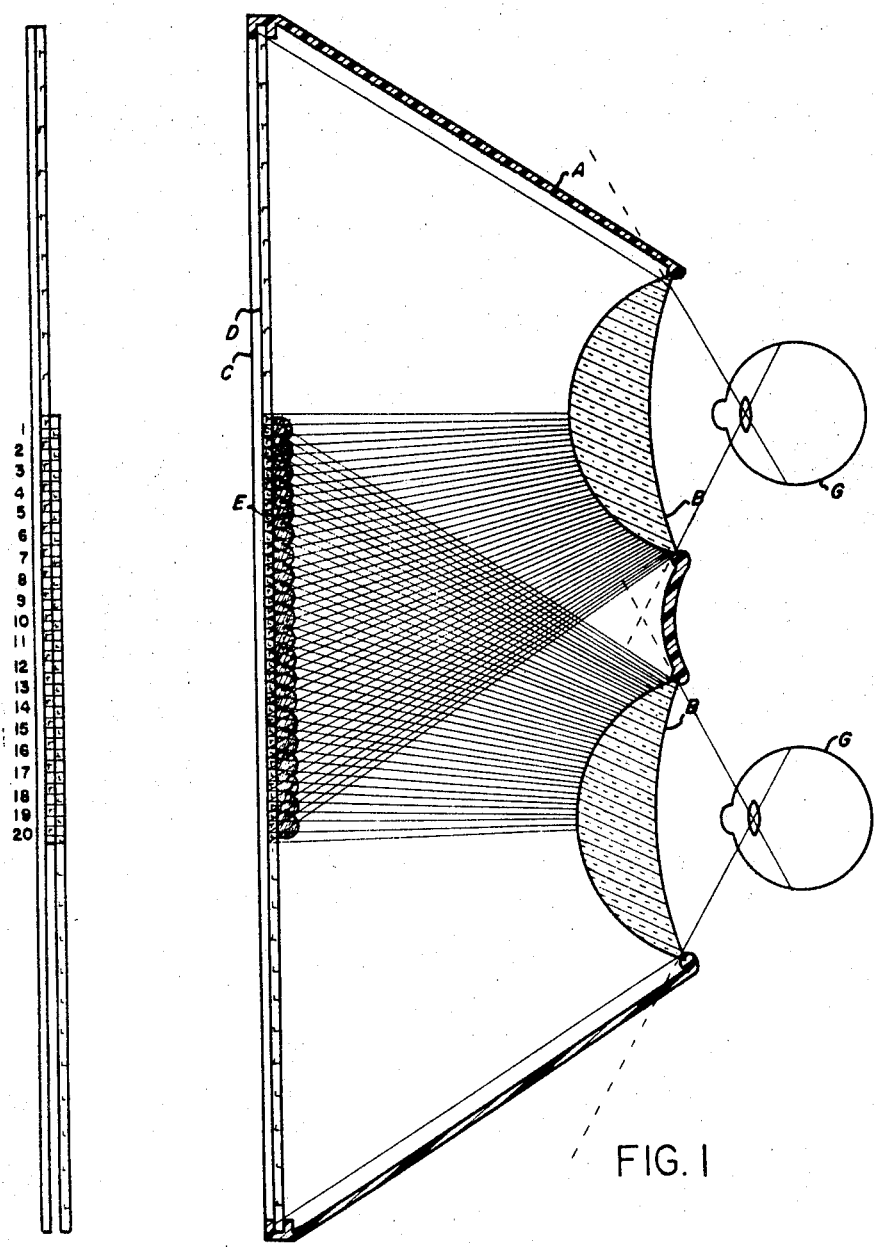
FIG. 1 is a diagrammatic illustration of the first contemplated embodiment and utility of my invention.
FIG. 2 is a diagrammatic illustration of an arrangement which may be used to produce the first embodiment or which may be used as the second contemplated embodiment of my invention.

Reference is now made to FIG. 1. There is provided a means A which supports oculars B in a position as shown. It may be seen from FIG. 1 that a line joining the oculars B is substantially parallel to the picture element D, that the perpendicular bisector of this line passes through the central strip of picture element D, and that this line is perpendicular to any of the strips r or L which are behind element E. In the form of the invention of FIG. 1, means A supports oculars B such that D is substantially at the focal plane of B whereby the eyes G of a viewer may bring the picture element D into focus. In the contemplated form of the invention of FIG. 1 picture element D is a transparency type picture element, which requires diffusing screen C, but as will be described in more detail later herein, this need not be the case.

The respective right and left eye views are overlapped in only a central area of the composite picture element D. This overlapped area is behind E. It may be seen from observing FIG. 1 that composite element D contains one portion which contains only a right eye image labelled r, one portion which contains only a left eye image labelled L, and a central portion which contains both right and left eye images (although they are separate) labelled both r and L.

In the contemplated embodiment of FIG. 1 the images in the central portion are made separate by making this area up of a multiplicity of vertical (perpendicular to the line joining the oculars) strip images r and l that are interlaced so that alternate strips r and alternate strips L are respectively strip images of the right and left eye images, see also U.S. Patents 3,251,284 and 624,042, cited more completely hereinafter.

In the contemplated form of FIG. 1 element E is a lenticular screen which works in a manner well known in the art of parallax stereoscopy to insure that only right eye elements r reach the right ocular and left image elements L reach the left ocular. For more information as to the detailed operation of the screen and strips of the central overlapped area, the reader is referred to my copending U.S. Patent 3,251,284 (noting particularly column 5, lines 64–75 and column 6, lines 1–28) which had its derivation from the same original disclosure as did the present application. Also the reader desiring more information is referred to U.S. Patents 624,042, issuing in 1899 to Jacobson and 1,882,424 issuing in 1932 to Ives.

As shown in FIG. 2, the picture element, which is equivalent to D of FIG. 1, could be made up of two sheets rather than one or it could have been recorded on two separate sheets which are combined as shown to produce a contact print upon only one sheet.

Figure 3:
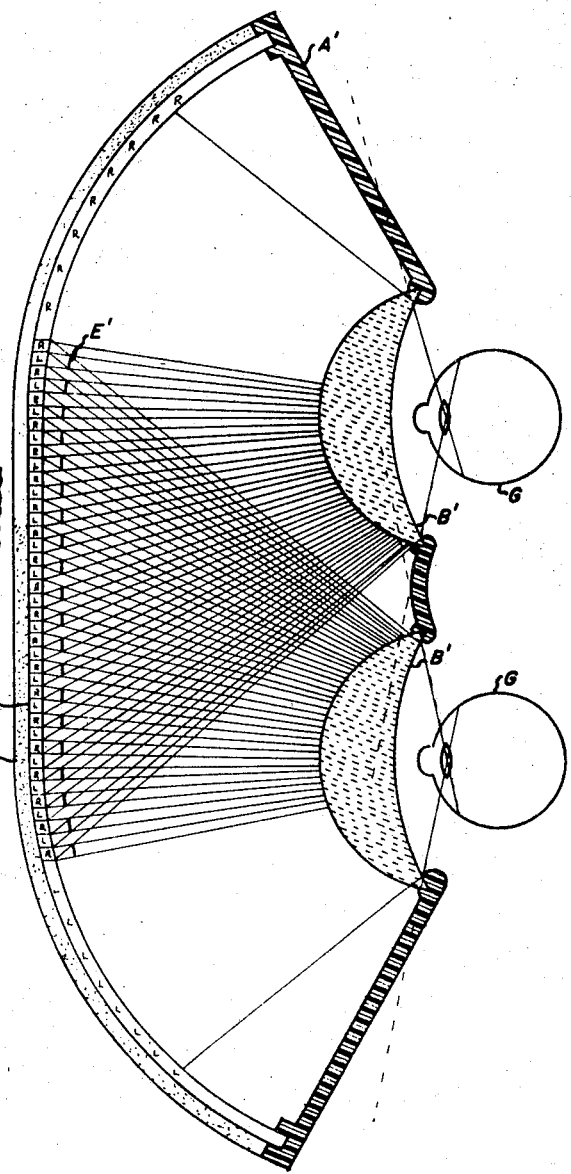
FIG. 3 is a diagrammatic illustration of the third contemplated embodiment and a utility therefor of my invention.

In the contemplated embodiment of FIG. 3, the composite picture element D' is supported for wider angle stereoperipheral re-creation by A' and diffusing screen C'. Elements A', B' and C' function in a manner obvious from the description of FIG. 1. Picture element D' is made up as described for FIG. 1 except that it is made for wider angle stereoscopic re-creation.

Element E' is a grating screen which could have been used in the device of FIG. 1 just as readily as the lenticular screen E. Element E' also functions in a manner well known in the art of parallax stereoscopy to insure that only right eye image elements r reach the right ocular and only left eye image elements L reach the left ocular.

Figure 4:
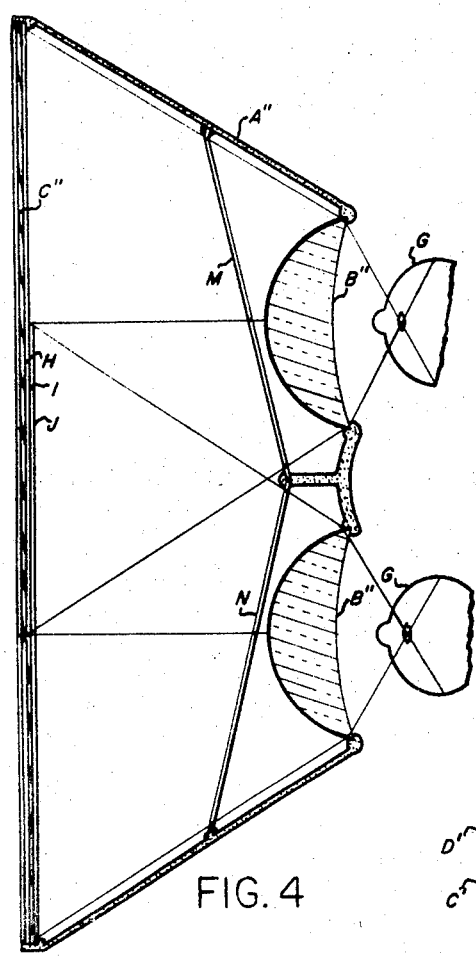
FIG. 4 is a diagrammatic illustration of the fourth contemplated embodiment and a utility therefor of my invention.

Referring to FIG. 4, elements A", B", and C" function as described for FIG. 1 except FIG. 4 shows the alternative arrangement designed for a picture element which is in an opaque form. Of course this picture element could also be in the form of a transparency. The picture element of FIG. 4 is made up of a right eye view sheet I which is polarizing in one plane and a left eye view sheet J which is differently polarized in one of the known operative manners. The two separate images I and J are overlapped in the central position as they were in FIGS. 1–3 and backed by a reflecting surface H in the well known manner. They could, of course also be transparencies.

Cross polarizers M and N coact with regard to the central portion of I and J in the well known manner to produce the same desired result set forth hereinabove for FIG. 1, i.e. the elimination of any visible demarcation between the two wide angle views.

Figure 5:
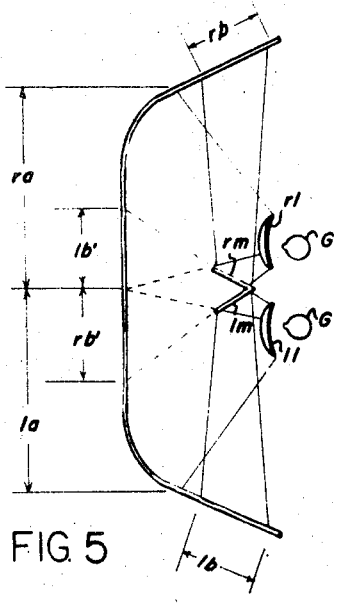
FIG. 5 is a diagrammatic illustration of the fifth contemplated embodiment and a utility therefor of my invention.

Reference is now made to FIG. 5. This figure illustrates an embodiment which may prove practical. In the picture element of this embodiment the separate right and left images in the central area are made up of a first portion consisting of a virtual right image $rb'$ coinciding with a real left image (the right part of $la$) and a second portion consisting of a virtual left image $lb'$ coinciding with a real right image (the left part of $ra$).

The means coacting with the picture element in this embodiment is a right eye view mirror $rm$ and a real reversed image $rb$ and a left eye view mirror $lm$ and real reversed image $lb$, see German Patent No. 226,260 to Eijkman. Mirror $rm$ obscures the viewing of the real image $la$ and reflects the real reversed image $rb$ to present the virtual image $rb'$ and this virtual image $rb'$ plus all of real image $ra$ is seen as one continuous wide angle right eye view, as seen through ocular $rl$ by G. Mirror $lm$ obscures the viewing of the real image $ra$ and reflects the real reversed image $lb$ and this virtual image $lb'$ to present the virtual image $lb'$ plus all of real image $la$ is seen as one continuous wide angle left eye view, as seen through ocular $ll$ by G.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. A composite picture element for forming a wide angle stereoscopic view when said composite picture element is viewed through a right eye ocular and a left eye ocular, said composite picture element comprising:
   a right eye and a left eye image, each of said images overlapping each other to form a central overlapped area and each of said images extending a substantial distance beyond said central overlapped area; and
   means optically alined with said images for segregating said images so that said right eye and said left eye image, including the central overlapped area of said images, are viewable through only said right eye and left eye ocular respectively.

2. The composite picture element of claim 1 wherein the central overlapped area of said right eye and left eye images are polarized at right angles with respect to each other.

3. The composite picture element of claim 2 wherein the mains associated with said images includes an analyzing means.

4. The composite picture element of claim 1 wherein the central overlapped area of said right eye and left eye images are made up of a multiplicity of vertical strip images that are interlaced so that adjacent strips are respectively strip images of the right eye and the left eye images.

5. The composite picture element of claim 4 wherein said means associated with said images includes a grating screen.

6. The composite picture element of claim 4 wherein said means associated with said images includes a lenticular screen.

7. The composite picture element of claim 1 wherein each of said images has a virtual image portion and a real image portion, the central overlapped area of said images being formed by the virtual image portion of each image overlapping a predetermined area of the real image portion of the other image.

8. The composite picture element of claim 7 wherein said means associated with said composite picture element includes a first and a second mirror, said first mirror generating the virtual image portion of said right eye image for viewing only through said right eye ocular while blocking said left eye image from view therethrough, and said second mirror generating the virtual image portion of said left eye image for viewing only through said left eye ocular while blocking said right eye image from view therethrough.

9. A stereoscopic device, comprising:
   first means for supporting a right eye and a left eye image wherein each image is divided into a first and a second portion optically aligned with second means for generating real images of the first portions of the right eye and left eye images;
   third means optically aligned with said first means for generating virtual images of the second portions of the right eye and left eye image and for overlapping the virtual images of the second portions of the right eye and left eye images with the real images of the first portions of the right eye and left eye images to form a right eye composite image and a left eye composite image; and
   fourth means optically aligned with each of said means for viewing the composite images wherein viewing of the right eye composite image is restricted to the right eye and viewing of the left eye composite image is restricted to the left eye, thereby generating a wide angle stereoscopic view of the images.

References Cited

UNITED STATES PATENTS

| 2,953,980 | 9/1960 | Montebello | 95—18 X |
| 2,955,156 | 10/1960 | Heilig | 178—6.5 |
| 3,272,069 | 9/1966 | Ratliff | 350—143 |
| 624,042 | 5/1899 | Jacobson | 88—1 |
| 3,272,069 | 9/1966 | Ratliff | 350—143 |

FOREIGN PATENTS 226,260  3/1909  Germany.

DAVID SCHONBERG, *Primary Examiner.*

P. R. GILLIAM, *Assistant Examiner.*

U.S. Cl. X.R.

350—132, 138

U.S. DEPARTMENT OF COMMERCE
PATENT OFFICE
Washington, D.C. 20231

UNITED STATES PATENT OFFICE
CERTIFICATE OF CORRECTION

Patent No. 3,439,972  April 22, 1969

Harvey L. Ratliff, Jr.

It is certified that error appears in the above identified patent and that said Letters Patent are hereby corrected as shown below:

Column 3, line 49, "mains" should read -- means --. Column 4, line 48, "3,272,069  9/1966  Ratliff ------ 350-143" should read -- 3,251,284  5/1966  Ratliff ------- 95-18 --.

Signed and sealed this 14th day of April 1970.

(SEAL)
Attest:

Edward M. Fletcher, Jr.
Attesting Officer

WILLIAM E. SCHUYLER, JR.
Commissioner of Patents